United States Patent [19]

Kudo et al.

[11] 4,374,961

[45] Feb. 22, 1983

[54] METHOD FOR MANUFACTURING HEAT-STABLE POLYESTERS USING PHOSPHONIC ACID COMPOUNDS WITH CYCLIC CARBONATES AND CATALYST

[75] Inventors: Kazushige Kudo; Yoshihiro Arai, both of Joyo; Ryoichi Tsurutani; Shun-ichi Kiriyama, both of Uji, all of Japan

[73] Assignee: Unitika Limited, Osaka, Japan

[21] Appl. No.: 268,312

[22] Filed: May 29, 1981

[30] Foreign Application Priority Data

May 9, 1980 [JP] Japan .................................. 55-78143

[51] Int. Cl.³ .............................................. C08G 63/76
[52] U.S. Cl. .................................... 525/439; 524/125; 524/139; 528/176; 528/272; 528/275; 528/286
[58] Field of Search ............... 528/176, 272, 275, 286; 525/439; 260/45.7 P; 524/125, 139

[56] References Cited

U.S. PATENT DOCUMENTS

| | | | |
|---|---|---|---|
| 2,802,807 | 8/1957 | Drewitt et al. | 525/439 X |
| 2,863,854 | 12/1958 | Wilson | 525/439 X |
| 3,446,766 | 5/1969 | Taylor | 528/275 X |
| 3,489,722 | 1/1970 | Kotani et al. | 528/286 X |
| 3,509,100 | 4/1970 | Stewart et al. | 528/275 X |
| 3,657,191 | 4/1972 | Titzmann et al. | 525/439 |
| 4,123,420 | 10/1978 | Kyo et al. | 260/45.7 P X |
| 4,266,046 | 5/1981 | Wu | 528/272 X |
| 4,327,207 | 4/1982 | Lazarus | 525/439 |

*Primary Examiner*—Lucille M. Phynes
*Attorney, Agent, or Firm*—Richard A. Anderson

[57] ABSTRACT

This invention is a method of manufacturing heat-stable polyesters, characterized in that phosphonic acid compounds are added, when heat-stable polyesters with decreased terminal carboxyl groups are manufactured by reacting polyesters and cyclic carbonate compounds in the presence of an alkali halide compound catalyst.

6 Claims, No Drawings

METHOD FOR MANUFACTURING HEAT-STABLE POLYESTERS USING PHOSPHONIC ACID COMPOUNDS WITH CYCLIC CARBONATES AND CATALYST

BACKGROUND OF THE INVENTION

This invention concerns a method for manufacturing heat-stable polyesters with decreased terminal carboxyl groups, particularly by using phosphoric acid compound with cyclic carbonates and a catalyst.

It is well known that removing terminal carboxyl groups (designated [COOH] below) is an effective way of increasing the heat stability, that is, the resistance to hydrolysis and amine decomposition, of polyesters. Various methods for decreasing the [COOH] of polyesters have been proposed, one of which is a method of reacting a polyester and a cyclic carbonate compound. It is known that in this method it is advantageous to use an alkali halide compound as a catalyst. However, the present inventors have investigated this method, and judged that there is a problem with it. The [COOH] groups of the polyesters which are decreased by the reaction with the cyclic carbonate compound increase again at subsequent stages, such as those of polycondensation, melting and molding, etc.

SUMMARY OF THE INVENTION

As a result of careful study aimed at solving this problem, the inventors discovered that adding a phosphonic acid compound is effective and arrived at the present invention.

This invention is characterized in that a phosphonic acid compound is added when heat-stable polyesters with decreased terminal carboxyl groups are manufactured by reacting a polyester and a cyclic carbonate compound in the presence of an alkali halide compound catalyst.

In this invention, "polyester" means a polycondensate of a dibasic acid, such as terephthalic acid, etc., and a dihydric alcohol, such as ethylene glycol, and is represented by polyethylene terephthalate. The kind of polyester is not, however, particularly limited to this. Moreover, it may be a homopolymer or a copolymer. As for the method of obtaining the polyester by polycondensation, the previously-known methods may be used without change.

As the cyclic carbonate compound of this invention, compounds expressed by Formula [I] can be used.

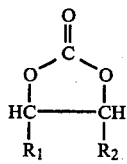

[I]

Here $R_1$ and $R_2$ are either hydrogen or monofunctional hydrocarbon groups with six or fewer carbon atoms; $R_1$ and $R_2$ may be the same or different groups. Concrete examples of $R_1$ and $R_2$ are hydrogen, methyl group, ethyl group, phenyl group, etc. A particularly appropriate example of a cyclic carbonate compound for this invention is ethylene carbonate, in which both $R_1$ and $R_2$ are hydrogen.

The "alkali halide compound" of this invention means a halide of an alkali metal such as sodium, potassium, cesium, rubidium, etc. The halogen may be chlorine, bromine, fluorine, iodine, etc. Desirable concrete examples are potassium iodide, cesium fluoride, sodium bromide, etc.

Moreover, as the phosphonic acid compound in this invention, a phosphonic acid compound with a structural unit expressed by Formula [II] is used.

[II]

Here R is hydrogen, or a monovalent hydrocarbon group with a carbon atom number of 1–18, or $R_4OH$, $COOR_5$, or $R_6COOR_7$. $R_4$ and $R_6$ are difunctional hydrocarbon groups with carbon atom numbers of 1–18; $R_5$ and $R_7$ are hydrogen, or monofunctional hydrocarbon groups with carbon atom numbers of 1–18 or $R_4OH$. Concrete examples are dimethyl phenyl phosphonate, diphenyl phenyl phosphonate, triethyl phosphonate, phenyl phosphonic acid, bis(beta-hydroxyethyl) phenyl phosphonic acid, ethyl dimethyl phosphonopropionate, tris(beta-hydroxy ethyl) phosphonate, a polycondensate of phenyl phosphonic acid dichloride and bisphenol A, a polycondensate of phenyl phosphonic acid dichloride and ethylene glycol, etc. As is clear from these concrete examples, the phosphonic acid compound may be a polycondensate as well as a monomolecular compound.

The quantity of cyclic carbonate compound added with respect to the polyester should be 0.2–10 weight percent. If the quantity is too small, the degree of blocking of [COOH] becomes less than what was aimed for; conversely, if it is too great, the reaction proceeds sufficiently, but problems such as a lowering of the degree of polymerization of the polyester result.

The quantity of alkali halide compound added as the catalyst should be 0.001–0.1 weight percent. The use of more than the required amount will further promote the regeneration of [COOH] after the reaction; hence, it should be used in as low a concentration as possible.

The reaction of the polyester and the cyclic carbonate compound is performed by adding the cyclic carbonate compound at the stage when the polyester has reached an intrinsic viscosity of 0.50, measured by using a phenol/tetrachloroethane (1/1 weight ratio) solvent at 20° C.; the time required is five minutes or more at a temperature at or above the ordinary melting point of the polyester. Naturally, it is necessary to add the alkali halide compound to this reaction system previously or at the same time (as the cyclic carbonate compound is added). This reaction is performed during the polycondensation reaction or after the aimed-for specified degree of polymerization is attained; after the reaction, it is necessary to apply a vacuum process to remove the unreacted cyclic carbonate compound and the carbon dioxide which is a by-product of the reaction. It is, of course, necessary at the time of the reaction to fill (the reaction vessel) with an inert gas atmosphere such as nitrogen gas or use some other method to isolate active gases such as oxygen which would promote the decomposition of the polyester. Moreover, the reaction should be performed while stirring.

This invention is one in which the phosphonic acid compound is present in the polyester at the time when the reaction is performed at a weight percentage of 0.001–1 percent. This addition may be done at any stage of the polycondensation of the polyester; of course, it may also be done at the same time as the addition of cyclic carbonate compound. The quantity of this phosphonic acid compound added may be the quantity mentioned above, but it is desirable for it to be one-half or more of the quantity of the alkali halide compound catalyst added; if so, its additive effectiveness is better manifested. By the addition of this phosphonic acid compound, the [COOH] groups of the polyester which are decreased by reacting with the cyclic carbonate compound do not present the problem previously seen, of increasing again in subsequent processes so that the desired level cannot be attained; instead, they are maintained at a very low level.

It is very important to note that this phosphonic acid compound does not hinder the catalytic function of the alkali halide compound during the reaction of the polyester and the ring carbonate, but it does have the effect of suppressing the subsequent decomposition reaction of the alkali halide with respect to the polyester. Such an effect has never been obtained with the previously known other phosphorus compounds. The detailed reaction mechanism of this effect of the phosphonic acid compound is not clear, but at any rate, by the method of this invention a desirable low concentration of [COOH] can be maintained.

Furthermore, it is of course also possible to add other additives to the polyester for other purposes at the time when the reaction of this invention is performed, and the reaction is not limited to the reaction with the polyester in its molten state, but may also be performed using a solid polyester and a gas or liquid cyclic carbonate compound.

The polyester with strongly reduced [COOH], obtained by the method of this invention, markedly extinguishes and improves the properties which represent defects of the conventional polyesters; their tendencies to hydrolyze or amine-decompose easily. It also increases the effectiveness in conventional uses (of the polyesters) and can be applied in new fields of use which were not possible before due to the existing previous defects. Thus, there is a great increase in its practical value.

PREFERRED EMBODIMENTS

This invention will be explained in more detail below by actual examples.

ACTUAL EXAMPLE 1

To a bis-beta-hydroxyethyl terephthalate (abbreviated as BHET in the following) obtained by the usual method from terephthalic acid and ethylene glycol, 0.03 weight percent antimony trioxide was added. One hour was needed for it to go from atmospheric pressure to 0.1 torr at a temperature of 280° C. The reaction was continued at the high vacuum of 0.1 torr for three hours, while stirring, and a polyethylene terephthalate (below, PET) with an intrinsic viscosity of 0.55 was obtained. At this stage, the system was returned to atmospheric pressure, while substituting nitrogen gas and 2 weight percent ethylene carbonate, 0.01 percent potassium iodide, and the various phosphorus compounds shown in Table 1 were added at 0.05 weight percent. Maintaining the temperature at 280° C., the reaction was performed for 10 minutes. Next, the pressure was again reduced to 0.1 torr, and the polycondensation reaction was performed for 2 hours. The polymer obtained was driven out. The characteristics of the PET obtained were as shown on the right hand side of Table 1.

TABLE 1

| No. | Ethylene Carbonate, Weight % | Potassium Iodide, Weight % | Phosphorus Compound* | PET Intrinsic Viscosity | [COOH]** | Notes |
|---|---|---|---|---|---|---|
| (1) | — | — | — | 0.84 | 38 | Comparative example |
| (2) | 2 | 0.01 | — | 0.83 | 25 | Comparative example |
| (3) | 2 | 0.01 | Phenyl phosphonic acid | 0.85 | 16 | Example of this invention |
| (4) | 2 | 0.01 | Dimethylphenyl phosphonate | 0.85 | 14 | Example of this invention |
| (5) | 2 | 0.01 | Triphenyl phosphonate | 0.84 | 15 | Example of this invention |
| (6) | 2 | 0.01 | Ethyl diethyl phosphonopropionate | 0.85 | 16 | Example of this invention |
| (7) | 2 | 0.01 | Trimethyl phosphate | 0.81 | 23 | Comparative example |
| (8) | 2 | 0.01 | Triphenyl phosphate | 0.81 | 23 | Comparative example |
| (9) | 2 | 0.01 | Phosphoric acid | 0.80 | 24 | Comparative example |

*Quantity added was 0.05 weight percent in all cases.
**Unit of [COOH]: Quantity/$10^6$ grams.

As is clear from Table 1, the addition of ethylene carbonate is intended to decrease the [COOH] groups, as in the case of (2), but its effect is not great. Even when the phosphoric acids or phosphoric acid esters (7), (8), and (9) which have been generally known up to now as heat stabilizers, are added to (2), they have almost no effect. In contrast, (3), (4), (5), and (6) which are phosphonic acid compounds of this invention, clearly produce satisfactory low [COOH] contents, which are markedly improved in comparison to the conventional examples. Furthermore, in this reaction, after a 10-minute reaction of PET with an intrinsic viscosity of 0.55, ethylene carbonate, and potassium iodide, (2)–(9), all have intrinsic viscosities of 0.53–0.54, and [COOH] of 3–5/$10^6$ grams; thus, the [COOH] blocking reaction was good in all cases. Consequently, the great difference in the [COOH] of the high-polymerization-degree PET after repolymerization represents a difference in thermal decomposability at the time of the repolymerization reaction. At this stage, it is clear that the phosphonic acid compounds of this invention markedly suppress the production of [COOH].

ACTUAL EXAMPLE 2

The PET was prepared by the same method as in Actual Example 1 with the following exceptions. Cesium fluoride was used instead of potassium iodide; the cesium fluoride was added at the stage when the polycondensation of the PET was begun, and the polycondensation catalyst antimony trioxide was added at the same time; and the times of the polycondensation reaction for obtaining high polymerization degree PET by repolymerization were adjusted so that under all conditions the intrinsic viscosity became 0.80.

The PET chips obtained were spun with an extruder-type melt spinner under the conditions of 295° C. melting temperatures, approximately 10 minutes melting time, and a spinning rate of 500 m/minute. Next the yarn was stretched in two stages with a stretching machine with a hot plate at 230° C. and a hot roller at 220° C., so that the total stretch ratio was 6.2. The yarn was wound at 200 m/minute, and a 1500 denier/192 filament PET yarn was made.

Table 2 shows the intrinsic viscosities and [COOH] of the PET chips and PET yarns. As is clear from Table 2, (12), (13), (14) and (15) of this invention had markedly lower [COOH] compared to (10), (11), (16), (17) and (18) of the conventional, comparative results.

was not clearly observed. But in (23)–(27), the [COOH] was markedly reduced by their effects. When the quantity added was too great, as in (28), an undesirable effect of lowering the intrinsic viscosity (in this example, lowering of the polymerization rate) was produced.

TABLE 3

| No. | Ethylene Carbonate, Weight % | Potassium Iodide, Weight % | Dimethyl Phenyl Phosphonate, Weight % | Intrinsic Viscosity | [COOH] | Notes |
|---|---|---|---|---|---|---|
| (19) | — | — | — | 0.80 | 25 | Comparative example |
| (20) | 1.5 | 0.002 | — | 0.80 | 18 | Comparative example |
| (21) | 1.5 | 0.01 | — | 0.80 | 19 | Comparative example |
| (22) | 1.5 | 0.002 | 0.0005 | 0.81 | 15 | Comparative example |
| (23) | 1.5 | 0.002 | 0.001 | 0.81 | 11 | Example of this invention |
| (24) | 1.5 | 0.01 | 0.005 | 0.80 | 12 | Example of this invention |
| (25) | 1.5 | 0.01 | 0.01 | 0.80 | 11 | Example of this invention |
| (26) | 1.5 | 0.01 | 0.1 | 0.79 | 11 | Example of this invention |
| (27) | 1.5 | 0.01 | 1.0 | 0.78 | 10 | Example of this invention |
| (28) | 1.5 | 0.01 | 2.0 | 0.75 | 10 | Example of this invention |

ACTUAL EXAMPLE 4

To BHET were added 0.04 weight percent germanium dioxide and 0.01 weight percent rubidium iodide. The pressure was reduced to 0.1 torr, requiring one hour at 285° C. The polymerization reaction was continued for two hours thereafter, and a PET with an intrinsic viscosity of 0.50 was produced. The reaction system was returned to atmospheric pressure, while

TABLE 2

| No. | Ethylene Carbonate, Weight % | Cesium Fluoride, Weight % | Phosphorus Compound | PET Chips Intrinsic Viscosity | [COOH] | PET Staple Yarn Intrinsic Viscosity | [COOH] | Notes |
|---|---|---|---|---|---|---|---|---|
| (10) | — | — | — | 0.80 | 35 | 0.75 | 42 | Comparative example |
| (11) | 2 | 0.01 | — | 0.80 | 22 | 0.74 | 29 | Comparative example |
| (12) | 2 | 0.01 | Phenyl phosphonic acid | 0.80 | 13 | 0.76 | 17 | Example of this invention |
| (13) | 2 | 0.01 | Dimethyl phenyl phosphonate | 0.80 | 12 | 0.76 | 16 | Example of this invention |
| (14) | 2 | 0.01 | Triphenyl phosphonate | 0.80 | 14 | 0.76 | 18 | Example of this invention |
| (15) | 2 | 0.01 | Ethyl diethyl phosphonopropionate | 0.80 | 14 | 0.76 | 18 | Example of this invention |
| (16) | 2 | 0.01 | Trimethylphosphate | 0.80 | 20 | 0.75 | 25 | Comparative example |
| (17) | 2 | 0.01 | Triphenyl phosphate | 0.80 | 20 | 0.75 | 25 | Comparative example |
| (18) | 2 | 0.01 | Phosphoric acid | 0.80 | 21 | 0.75 | 27 | Comparative example |

ACTUAL EXAMPLE 3

PET chips with an intrinsic viscosity of 0.72 and [COOH] of 25/10^6 grams were placed in an extruder, melted at 280° C., and fed through a polymer line to a vertical thin-membrane continuous polymerizer. A mixture of ethylene carbonate, potassium iodide, and dimethylphenyl phosphonate as shown in Table 3, i.e., an ethylene carbonate solution, was added by pressing it in during the passage in the polymer line. The reaction was performed for 10 minutes at 280° C., using a 20-stage static mixer introduced into the polymer line, and it was then fed into the above-mentioned polymerizer. Next, it was polymerized continuously in the said polymerizer under the following conditions: temperature 290° C.; pressure 0.1 torr; residence time one hour. The polymer was then driven out of the bottom.

As is clear from the results shown in Table 3, the effect of adding the phosphonic acid compounds of this invention is very marked, and the desirable addition quantity is within the approximate range of 0.001–1 weight percent.

In other words, compared to the conventional examples (20) and (21), the quantity of dimethylphenyl phosphonate added in (22) was insufficient; hence, its effect substituting nitrogen gas, and at this point, 4 weight percent ethylene carbonate and 0.02 weight percent of each of the following phosphorus compounds were added. (29):neither ethylene carbonate nor any phosphorus compound aded; (30):only ethylene carbonate added; (31):a condensate of 3 molar parts ethylene glycol and 2 molar parts phenyl phosphonic acid dichloride, i.e., bis(beta-hydroxyethyl)phenyl phosphonate polymer; (32):triphenyl phosphine; (33):triphenyl phosphite; (34):triphenyl phosphine oxide.

After the reaction was performed at 285° C. and atmospheric pressure for 20 minutes, polymerization was performed again for two hours at the high vacuum of 0.1 torr.

The intrinsic viscosities and [COOH] (unit: quantity/10^6 grams) of the PET obtained were: (29): 0.73, 29; (30): 0.72, 22; (31): 0.72, 12; (32): 0.72, 22; (33): 0.72, 21: (34): 0.71, 20. It is clear that apart from the example of this invention, (31), the [COOH] was reduced very little. Thus, the effect of this invention in maintaining a low [COOH] is evident.

We claim:

1. In a method to manufacture heat-stable polyester using cyclic carbonate compounds catalyzed with an alkali halide compound, the improvement comprising adding a phosphonic acid compound of the structure

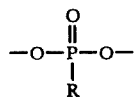

wherein R is hydrogen, a monovalent hydrocarbon group with a carbon atom number of 1-18, $R_4OH$, $COOR_5$, or $R_6COOR_7$; $R_4$ and $R_6$ are difunctional hydrocarbon groups with carbon atom numbers of 1-18; $R_5$ and $R_7$ are hydrogen, monofunctional hydrocarbon groups with carbon atom numbers of 1-18 or $R_4OH$.

2. The method of claim 1 wherein the phosphonic acid compound is added in an amount between about 0.001 and 1 percent by weight.

3. The method of claim 1 or 2 wherein the phosphonic acid compound is selected from the group consisting of dimethyl phenyl phosphonate, diphenyl phenyl phosphonate, triethyl phosphonate, phenyl phosphonic acid, bis(beta-hydroxyethyl) phenyl phosphonic acid, ethyl dimethyl phosphonopropionate, tris(beta-hydroxy ethyl) phosphonate, a polycondensate of phenyl phosphonic acid dichloride and bisphenol A, and a polycondensate of phenyl phosphonic acid dichloride and ethylene glycol.

4. The method of claim 1 or 2 wherein the cyclic carbonate compound is added in an amount of from about 0.2 to 10 percent by weight and alkali metal halide is added in an amount between about 0.001 and 1 percent by weight.

5. The method of claim 4 wherein the cyclic carbonate compound is added after the polyester has reached an intrinsic viscosity of 0.5.

6. The method of claim 4 wherein the phosphonic acid compound is added in an amount one-half or greater than the quantity of alkali metal halide added.

* * * * *